United States Patent Office 3,307,649
Patented Mar. 7, 1967

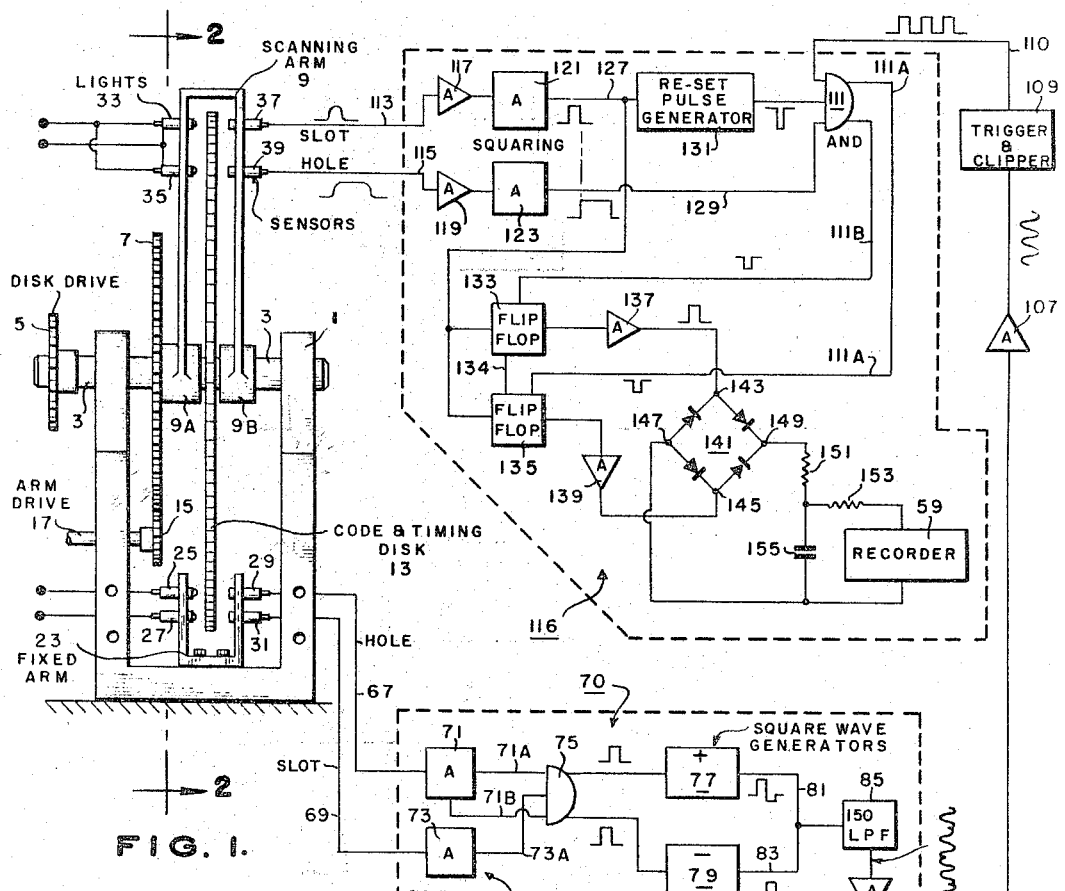
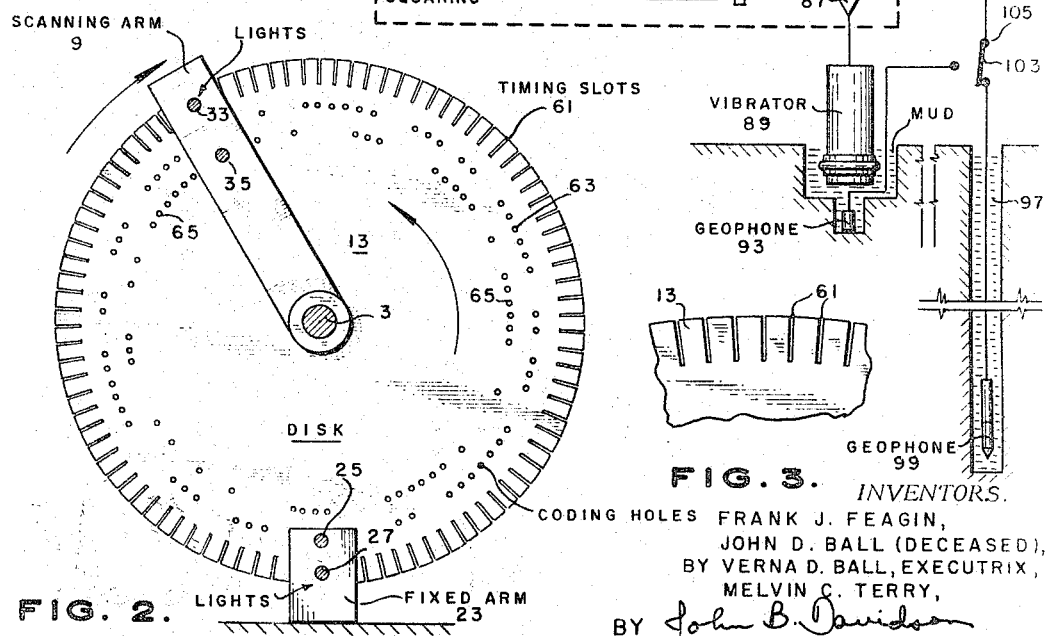

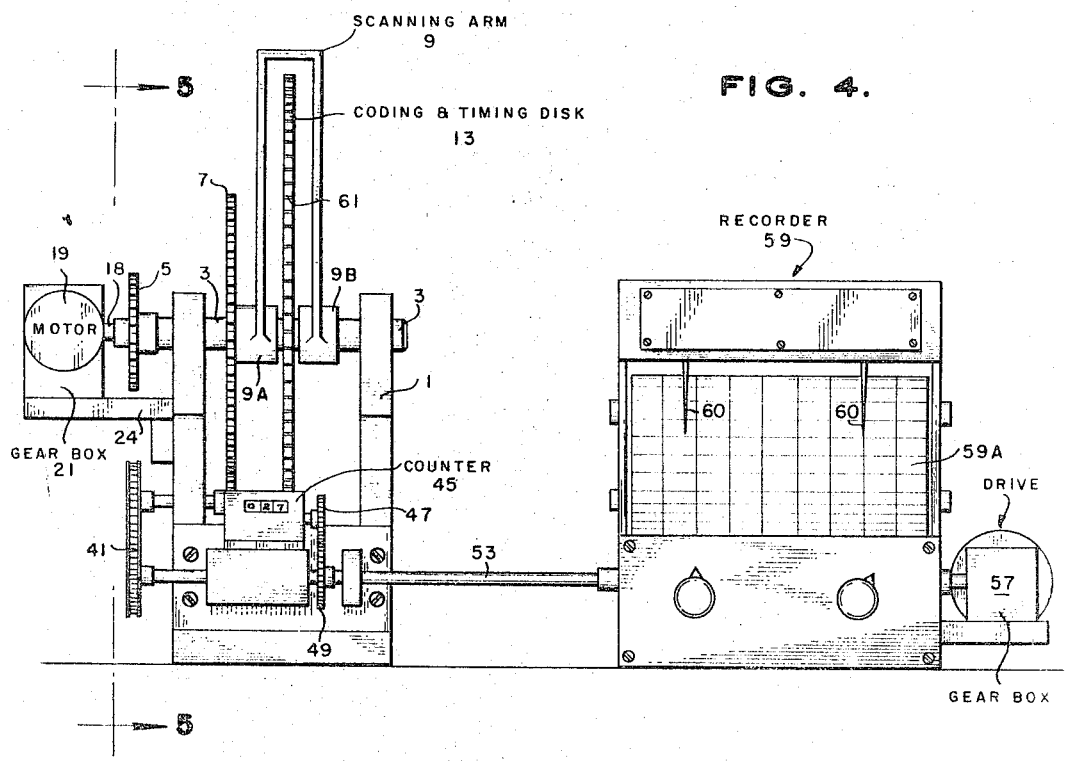
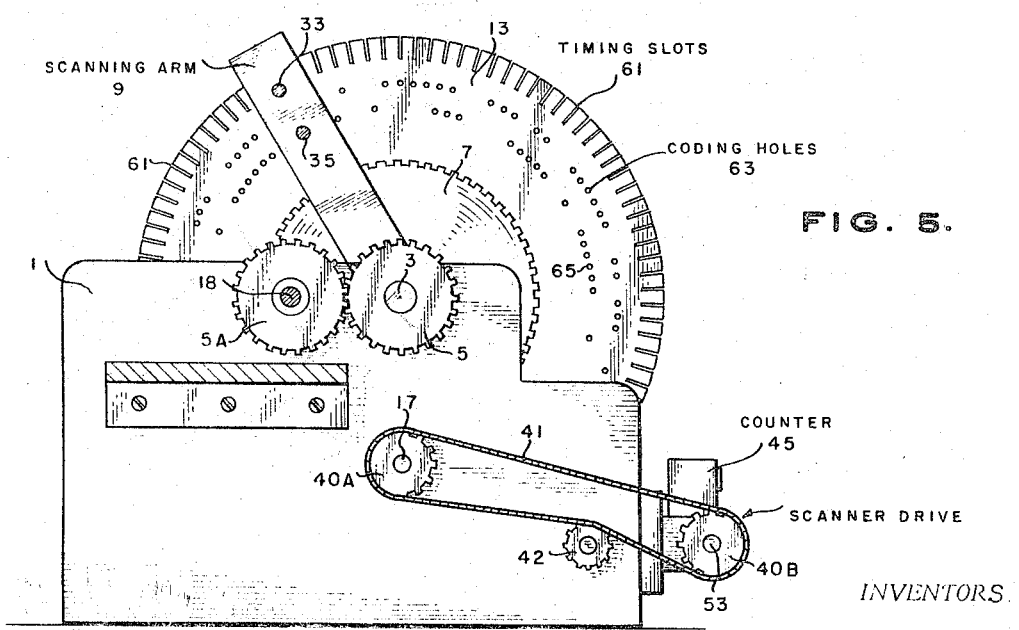

3,307,649
SEISMIC SYSTEM USING A SLOTTED DISC SOURCE PRODUCING A BINARY CODE
John D. Ball, deceased, late of Harris County, Tex., by Verna D. Ball, executrix, Harris County, Tex.; Frank J. Feagin and Melvin C. Terry, Harris County, Tex., assignors to Esso Production Research Company, a corporation of Delaware
Filed July 21, 1965, Ser. No. 474,215
9 Claims. (Cl. 181—.5)

This invention relates generally to well logging, and more particularly to apparatus for obtaining the seismic travel time from the earth's surface to a point in a well which is within the interval covered by a sonic well log.

Obtaining the seismic travel time from the earth's surface to a point in a well which is within the interval covered by a sonic log makes it possible to prepare a travel time curve for the entire well by integrating the log. At the present time, this tie information is usually obtained by seismic shooting techniques. The inconvenience and expense involved in drilling and loading the shot holes required to make the time-ties frequently results in failure to obtain this information. Also, the geophysical service companies who make sonic velocity logs are unwilling to undergo the hazard and the inconvenience of detonating explosive charges. Therefore, unless oil company personnel or a special contractor performs the operation, the valuable velocity information usually is not obtained.

The present invention provides a simple, rugged apparatus for measuring seismic travel time from the earth's surface to a geophone, in which a coded series of relatively weak seismic pulses is used as a seismic signal instead of a single, very strong pulse, such as is produced when dynamite is detonated. The detection apparatus uses cross correlation to determine the travel time. The coded signal is generated by using a pulse generating means capable of producing a timing pulse train of equally time-spaced electrical pulses, and a coded pulse train of time-spaced pulses having a pseudo-random time distinction. A particularly suitable coded pulse train is one which has a time distribution determined by a binary code of maximal length. Each pulse in the coded pulse train is concomitant with a pulse in the time pulse train. A circuit connected to the pulse generating means produces a sinusoidal output signal having one phase responsive to concomitant pulses of the coded pulse train and the timing pulse train, and having an opposite phase responsive to a pulse from the timing pulse train which is unaccompanied by a pulse from the coded pulse train. Only a single-cycle output signal is produced responsive to either condition, the cycle having a period equal to the time between timing pulses. This electrical output signal is used to drive an acousto-electric transducer so that the signal injected into the earth has substantially the same waveform as the output signal from the circuit means.

The correlator comprises several electrical circuits connected together in a unique configuration. The pulse generating means also includes apparatus for producing a second timing pulse train and a second coded pulse train similar to the pulse trains mentioned above, but adjustably delayed relative to the other pulse trains. An electrical circuit is connected to an electrical terminal means which receives electrical signals from a geophone which may be either spaced only a short distance from the electro-acoustic transducer or may be located at a determinable depth within a well bore. This circuit is adapted to produce an output pulse upon detection of a predetermined condition of the geophone output signal, such as at an amplitude peak or at zero amplitude. Another electrical circuit is connected to the pulse generating means and to the last-named circuit means for producing an output pulse of one polarity in an output circuit thereof upon concomitant reception thereby of pulses from the second coded pulse train and the second timing pulse train, and an output pulse of the opposite polarity upon concomitant reception thereby of a pulse from the second timing pulse train and a pulse from the second electrical circuit. Means connected to the circuit means integrates the output pulses thereof and records the integrated pulses. When a noise signal having a Gaussian time distribution is produced by the geophone, the oppositely-polarized pulses integrated by the correlator will be about equal in number so that the recorded signal will be of about zero amplitude. However, when the geophone detects a signal from the electro-acoustic transducer, and this signal is brought into time coincidence with the second coded signal, the integrated signal will suddenly become of large amplitude so that the time delay between the two coded signals produced by the pulse generator will be equal to the travel time of seismic signals from the electro-acoustic transducer to the geophone.

Objects and features of the invention not apparent from the above discussion will become evident upon consideration of the following detailed description thereof taken in connection with the accompanying drawings, wherein:

FIG. 1 is a side view of a portion of the pulse generating apparatus and an electrical schematic diagram of electrical pulse-shaping and correlating apparatus in accordance with a preferred embodiment of the invention;

FIG. 2 is a sectional view taken along section 2—2 of FIG. 1;

FIG. 3 is an enlarged view of a fragment of the outer edge of the disc of FIG. 2;

FIG. 4 is a more complete side view of the pulse generating and recording apparatus of FIG. 1, and FIG. 5 is a sectional view taken along section 5—5 of FIG. 4.

With reference now to the figures generally, there is shown an electrical pulse generating means comprising a support member 1 and a disc 13 connected to a shaft 3 adapted to be driven by an electrical motor 19 (see FIG. 4) which is journalled in bearings in the support member. The disc 13 contains a plurality of timing slots 61 (see FIGS. 2 and 3) which are uniformly spaced apart, a plurality of first code holes 63, and a plurality of second code holes 65. The code holes are positioned on circular paths of different radii, and each hole is radially in line with one of the timing slots 61. The distribution of each group of code holes in in accordance with a binary code of maximal length. The shaft 3 is axially connected to the disc 13. A U-shaped member 23 is connected to the support member and has flanges which are disposed on either side of the disc at the lower end thereof. One flange of the U-shaped member 23 supports a pair of light sources 25 and 27 which are aligned with the circle of code holes 63 and the timing slots 61, respectively. On the opposite side of the disc are a pair of light sensors 29 and 31 which are also aligned with the light sources 25 and 27, respectively, so that light from the light sources is detected by the light sensors 29 and 31 after passing through the code holes 63 and slots 61, respectively. Thus, when the sensors 29 and 31 detect either light passing through one of the code holes or through one of the slots, as the case may be, an electrical pulse of very short time duration is produced thereby. For the purpose of producing timing pulses and coded pulses which are time-delayed relative to the pulses produced by sensors 29 and 31, there is used a scanning arm 9 which supports the pair of light sources 33, 35, and light sensors 37 and 39. Sensor 37 and light source 33 are oppositely-disposed on either side of disc 13 so that light from source 33 passes through slots 61 and impinges on sensor 37 to produce output pulses when source 33, one of the slots 61, and sensor 37 are in line. Similarly, source 35 and sensor 39 are disposed on either side of disc 13 so as to be in line with holes 65 to produce a series of coded pulses. The light sources 33, 35, 25, and 27 are energized by any convenient and appropriate source of electricity. The scanning arm 9 is rotatably supported on shaft 3 or on a housing for the shaft so as to rotate about the same axis as disc 13. As is best illustrated in FIG. 4, the scanning disc 13 is driven from motor and gear box 57 through a shaft 53, gears 40A and 40B which are connected by a chain 41, shaft 17, and gears 15 and 7. Gear 7 is connected to scanning arm 9 by an annular bearing member 9A. Bearing member 9B provides support for the other side of the scanning arm 9 on shaft housing 3. A counter 45, which is for the purpose of providing an indication of the number of degrees through which scanning arm 9 is turned, is connected to shaft 53 through gears 47 and 49. Idler wheel 42 (see FIG. 5) is for the purpose of taking up the slack in chain 41. A recorder 59 having a pair of styli 60 is driven by motor 57 through shaft 53 and is for the purpose of recording the output voltage of the correlator to be described below. The movement of recorder chart 59A can thus be synchronized with the movement of scanning arm 9 so that each is rotated through the same number of degrees from a reference position by motor and drive unit 57. The disc 13 is rotated by a drive unit 19 which may include an electric motor and gear box 21, which is connected to shaft 18. The motor and gear box 21 are supported on motor mount 24 so that the gear box drives shaft 3 through gears 5 and 5A, gear 5A being connected to shaft 18.

The electrical sensors 29 and 31 are connected to a vibrator or electro-acoustic transducer 89 by means of an electrical circuit 70 which functions to produce a single-cycle sinusoidal output signal having a given phase, responsive to concomitant pulses received on lines 67 and 69 from sensors 29 and 31, respectively, and to produce a similar signal having the opposite phase responsive to a pulse from sensor 31 which is unaccompanied by a pulse from sensor 29. This apparatus comprises a pair of squaring circuits 71 and 73 connected to sensors 29 and 31, respectively, and AND circuit 75 connected to the squaring circuits 71 and 73, square wave generators 77 and 79, and a low pass filter circuit 85. A power amplifier 87 also may be included to amplifiy the output signal of the low pass filter. The squaring circuit 71 is connected to AND circuit 75 by lines 71A and 71B, and squaring circuit 73 is connected to AND circuit 75 by output line 73A. The squaring circuit 71 is operative to produce a pulse on either line 71A or line 71B; a pulse is produced on line 71A when no pulse is received on line 67 at a given instant, and a pulse is produced on line 71B when a pulse is fed to the squaring circuit 71 on line 67. AND circuit 75 triggers square wave generator 81 when a pulse is produced on line 71A alone. When pulses are produced on line 71B and 73A at the same instant, AND circuit 75 triggers square wave generator 79. The square wave generators 77, 79 are each operative to produce a single-cycle rectangular wave pulse having a period equal to the time interval between pulses produced on line 69. The rectangular wave signal produced by generator 77 is of opposite phase relationship to that produced by generator 79. In other words, and by way of example, if the waveform of the output signal of generator 77 is such that the signal originally goes positive and then goes negative, then the output signal of generator 79 will first go negative and then go positive. The output signals of the generators 77, 79 appearing on lines 81 and 83 are combined and fed to a low pass filter circuit 85, which is operative to shape the combined output signals of generators 77 and 79 to substantially sinusoidal waveform. The output signal of low pass filter 85 thus will be a sinusoidal signal which is variable between mutually opposite phases in accordance with a binary code of maximal length, which, as is well known in the art, is pseudo-random in nature. This output signal is amplified by power amplifier 87 and is used to drive vibrator 89. Vibrator 89 may be coupled to the earth by a liquid medium in a small hole or depression 91 in the ground in the usual manner. This vibrator may comprise an electro-hydraulic device such as is used for reflection seismography, or a transducer such as a large, loudspeaker-type unit.

Acoustic signals generated by the vibrator 89 are detected by a well geophone 99 which may be disposed at any preselected depth in well 97, and by a geophone 93 which is disposed a foot or two away from the vibrator 89 underneath the vibrator. The geophone signals are selectively connected to electrical terminal means 105 by switch means 103. The geophone signals applied to terminal means 105 are amplified by amplifier 107 and then infinitely clipped by means of a clipper and Schmitt trigger 109 to produce output pulses on line 110 of uniform pulse width which are initiated responsive to predetermined signal conditions of the electrical signals applied to terminal means 105. For example, the clipper and Schmitt trigger 109 may be adjusted so that the output pulses are produced whenever the signals applied to terminal means 105 change from a negative polarity to a positive polarity. Alternatively, the apparatus may be designed to produce an output pulse of uniform pulse duration when the geophone output signal reaches a peak amplitude. Apparatus adapted for this purpose is well known to the art and will not be further described herein.

The signals appearing on line 110 are correlated with the output pulses produced by sensor 39 by correlating apparatus 116. The uniformly, time-spaced timing pulses produced by sensor 37 are applied to a squaring circuit 121 through an amplifier 117, and the pseudo-random coded pulses produced by sensor 39 are applied to a squaring circuit 123 through amplifier 119. The output pulses produced by squaring circuits 121 and 123 are respectively about five milliseconds and 30 milliseconds in duration, with the pulse appearing on line 129 from squaring circuit 123 being slightly time-delayed with respect to the pulse produced on line 127 responsive to concomitant pulses applied to squaring circuits 121, 123 from lines 113, 115. The output pulses from squaring circuit 121 are applied to a reset pulse generator 131 and to flip-flop circuits, or bistable multivibrators, 133, 135. The reset pulse generator 131 functions to produce a very short output pulse slightly time-delayed with respect to the pulse applied to the generator from line 127. The output signals of Schmitt trigger and clipper circuit 109, reset pulse generator 131, and squaring circuits 123, are all applied to an AND circuit 111 having a pair of output lines 111A and 111B. The design of AND circuit 111 is such that concomitant pulses from pulse generator 131 and Schmitt trigger and clipper 109 will produce an output pulse on line 111A, and concomitant pulses from squaring circuit 123 and pulse generator 131 will produce an output pulse on line 111B. Lines 111A and 111B are respectively connected to flip-flop circuits 135 and 133 so as to trigger the flip-flops and produce pulses therefrom. The signals applied to the flip-flop circuits 133, 135 from squaring circuit 121 function to return the flip-flops to their initial operating condition and will not produce an output pulse from the flip-flops. Inasmuch as the slight time delay provided by pulse generator 131 delays the pulses on lines 111A and 111B with respect to the pulse produced by the squaring circuit 121, the flip-flops 133, 135 are always returned to an initial stable condition prior to reception by either of the flip-flops of an output pulse from AND circuit 111. The pulses appearing on lines 111A and 111B may be about ten milliseconds in duration.

The output signals of flip-flops 133, 135 are of mutually opposite polarity and are coupled to input terminals 143, 145 of a bridge rectifier 141 through isolating amplifiers 137, 139 which may be of the cathode follower or emitter follower type. A positive pulse is applied to terminal 143 by flip-flop 133, and a negative-going pulse is applied to terminal 145 by flip-flop 135. The flip-flop circuits may be connected together internally, as by a line 134, or to ground, so that the function of the bridge rectifier 141 is to combine the output signals of the flip-flops 133, 135 so when concomitant pulses are produced by flip-flops 133, 135, terminal 149 will be driven positive with respect to terminal 147. An integrating circuit comprising series-connected resistor 151 and capacitor 155 is connected between terminals 149 and 147 so that each pulse appearing between terminals 149, 147 will charge capacitor 155 by a small amount. The capacitor 155 is connected to the stylus of recorder 59 through resistor 153 so that the voltage across capacitor 155 is recorded by the recorder either as excursions from a reference position on a paper chart, or as variations in intensity on a magnetic recording medium. The time constant of resistor 151 and capacitor 155 may be between 8 and 15 seconds.

It should be noted that the hole spacing sequence of the groups of holes 63, 65 is the same, although the holes are displaced from each other so that the pulses produced by sensor 39 are coincident with the pulses produced by sensor 29 at some given position of the scanning arm, such as that indicated by line 2. Manifestly, the construction of the scanning arm is such that it cannot rotate through a complete 360° arc because of the interference offered by fixed arm 23. It is essential, however, that time coincident coded pulse sequences be produced by sensors 29 and 39 a some position of scanning arm 9.

The operation of the apparatus described above is as follows. Let it be assumed that scanning arm 9 is positioned slightly counterclockwise from the position whereat the pulses produced by sensors 29 and 39 are time coincident (i.e., as indicated by line 2 in FIG. 2), and that drive motor 19 has been energized so that disc 13 is rotating at a constant speed which, for example, may be about 36 r.p.m. Sensors 29 and 31 will produce coded pulses so that amplifier 87 will produce a sinusoidal signal variable between mutually opposed phases in accordance with a pseudo-random code, which may be a binary code of maximal length. Vibrator 89 will be driven to produce seismic waves in accordance with the electrical signal applied thereto from amplifier 87. Drive unit 57 is energized to slowly rotate scanning arm 9 and recorder 59 in synchronism at a rate of .036 r.p.m., for example. Initially, switch 103 is thrown so that the output signals of geophone 93 are coupled to terminal means 105. Until such time as the signals produced by Schmitt trigger and clipper circuit 109 responsive to the output signals of geophone 93 are in time coincidence with the signals produced by sensor 39, the flip-flop circuits 133 and 135 will produce output signals, only relatively few of which are concomitant. Therefore, the voltage appearing across capacitor 155 will be very small. However, as the arm 9 is moved so that the time delay between the pulses produced by Schmitt trigger and clipper 109 and sensor 39 is substantially equal to the time delay between the pulses produced by sensors 29 and 39, the flip-flop circuits 133 and 135 will produce pulses at substantially the same time so that the voltage across capacitor 155 will increase to a peak. The integrating capacitor is shunted by resistor 153 and the interval resistance of the recorder, and may be of such a value that at exact time concidence, the voltage across capacitor 155 rises to a predetermined magnitude. A correlation peak thus will be produce at a time when the scanning arm is aligned with line 2 and when geophone 99 is connected to terminal 105. Thereafter, the switch 103 is thrown to connect well geophone 99 to terminal 105. As the scanning arm is gradually rotated, the output voltage appearing across capacitor 155 will quickly decrease to about zero, and at some later time when the delay provided by the scanning arm is equal to the travel time of seismic waves from vibrator 89 to well geophone 99, the integrated voltage across capacitor 155 will again rise to a peak. By knowing the rotational speed of disc 13, and by knowing the angle through which the disc and recorder rotated between correlation peaks, the travel time of seismic waves from vibrator 89 to geophone 99 can be quickly determined.

The various circuit components denoted in block form in FIG. 1 are all commercially available and, for example, may be of the type manufactured by Engineered Electronics Company and designated according to the following schedule:

Squaring circuits _____ T–106.
Reset pulse generator _____ T–105.
AND circuits _____ T–410A.
Flip-flops _____ T–103.
Clipper and Schmitt trigger _____ T–172A.
Square wave generator _____ T–105's and T–440's.

Having described the principle of the invention and the best mode in which it is contemplated to apply that principle, it is to be understood that the apparatus described is illustrative only, and that other means can be employed without departing from the true scope of the invention defined in the following claims.

What is claimed is:

1. Apparatus for measuring the travel time of seismic waves between the earth's surface and a geophone spaced therefrom, comprising:

a support member;

a disc containing a plurality of radial timing slots uniformly spaced apart, a plurality of first code holes, and a plurality of second code holes, said first and second code holes being positioned on circular paths of first and second radii, respectively, radially in line with said timing slots, the distribution of said code holes being according to a binary code of maximal length;

a shaft for connection to a motor, axially connected to said disc and journalled in said support member for rotating said disc;

a scanning arm rotatively supported about said shaft for rotation thereon independent of the rotation of said disc and shaft;

first light source means and first and second light detecting means positioned on opposite sides of said disc such that said first light detecting means detects light passing through said timing slots to produce first electrical output pulses, and second light detecting means detects light passing through said first code holes to produce second electrical output pulses;

second light source means and third and fourth light detecting means positioned on said scanning arm on opposite sides of said disc so that said third light detecting means detects light passing through said timing slots to produce third electrical output pulses and said fourth light detecting means detects light passing through said second code holes to produce fourth electrical output pulses;

first AND circuit means connected to said first and second light detecting means for producing a pulse in a first output circuit thereof responsive to pulses concomitantly received from said first and second light detecting means, and for producing a pulse in a second output circuit thereof responsive to a pulse only from said first light detecting means;

first and second rectangular wave generators respectively connected to said first and second output circuits of said AND circuit means for producing one-cycle rectangular waves of opposite phase relationship having a period equal to the time between pulses from said first light detecting means;

low pass filter means connected to the outputs of said first and second rectangular wave generators for shaping the output signals thereof to substantially sinusoidal waveform;

transducer means connected to said low pass filter means for producing seismic waves responsive to said low pass filter means output signals;

electrical terminal means for connection to said geophone;

first means connected to said terminal means for producing pulses responsive to predetermined signal conditions of the electrical signals applied to said terminal means;

first pulse generator means connected to said third light detecting means for producing a delayed output pulse responsive to each pulse received from said third light detecting means;

second AND circuit means connected to said first means, said first pulse generator means, and said fourth light detecting means, for producing an output pulse in a first output circuit thereof responsive to simultaneous reception of pulses from said first means and said first pulse generator means, and for producing an output pulse in a second output circuit thereof responsive to simultaneous reception of pulses from said fourth light detecting means and said first pulse generator means;

first and second bistable multivibrator means, each electrically connected to said third light detecting means to be set in a first stable state thereof responsive to an output pulse from said third light detecting means, and respectively connected to said first and second output circuits of said second AND circuit means, each operative to produce a pulse responsive to reception of a pulse from the second AND circuit means connected thereto, the pulses produced by said first and second bistable multivibrator means being of mutually opposite polarity;

full-wave rectifier means having a pair of input terminals and a pair of output terminals;

integrating circuit means connected to said rectifier means output circuit;

recording means connected to said integrating circuit means for producing a trace indicative of the output voltage thereof;

said input terminals of said rectifier means being respectively connected to said first and second bistable multivibrator means so that a pulse of one polarity is applied to said integrating circuit when concomitant pulses are produced in the output circuits of said second AND circuit means and a pulse of the opposite polarity is applied to said integrating circuit means when a pulse appears only in said second AND circuit means first output circuit.

2. Apparatus for measuring the travel time of seismic waves between the earth's surface and a geophone spaced therefrom, comprising:

pulse generating means for producing first and second timing pulse trains of equally time-spaced electrical pulses, first and second coded pulse trains of time-spaced pulses having a pseudo-random time distribution, each pulse in said first coded pulse train being concomitant with a pulse in said first timing pulse train and each pulse in said second coded pulse train being concomitant with a pulse in said second timing pulse train, said pulse generating means further including means for adjustably delaying one of said coded pulse trains relative to the other of said coded pulse trains;

first circuit means connected to said pulse generating means for producing a sinusoidal output signal having one phase responsive to concomitant pulses of said first coded pulse train and first timing pulse train, and having the opposite phase responsive to a pulse from said first timing pulse train unaccompanied by a pulse from said first coded pulse train;

transducer means connected to said first circuit means for producing seismic waves responsive to the output signal thereof;

electrical terminal means for connection to said geophone;

second circuit means connected to said terminal means for producing pulses responsive to predetermined signal conditions of the electrical signals applied to said terminal means;

third circuit means connected to said pulse generating means and to said second circuit means for producing an output pulse of one polarity in an output circuit therein upon concomitant reception thereby of pulses of said second coded pulse train and said second timing pulse train, and an output pulse of the opposite polarity upon concomitant reception thereby of a pulse from said second timing pulse train and a pulse from said second circuit means; and;

means connected to said third circuit means for integrating said output pulses of said third circuit means and for recording the integrated pulses.

3. The apparatus of claim 2 wherein said first circuit means comprises fourth circuit means connected to said pulse generating means responsive to concomitant pulses in said first timing pulse train and said first coded pulse train for producing a single-cycle rectangular wave signal having a given phase, and responsive to each pulse in said first timing pulse train unaccompanied by a pulse in said first coded pulse train to produce a single-cycle rectangular wave signal having the opposite phase from said given phase, each single-cycle rectangular wave signal produced by said fourth circuit means having a period equal to the period between pulses in said first timing pulse train, and low pass filter means for shaping said rectangular waves to substantially sinusoidal waveform.

4. The apparatus of claim 2 wherein said third circuit means comprises fifth circuit means connected to said pulse generating means and said second circuit means for producing an output pulse of one polarity in an output circuit thereof upon concomitant reception thereby of pulses in said second timing pulse train and said second coded pulse train, and for producing an output pulse of the opposite polarity upon concomitant reception thereby of pulses from said second circuit means and in said second timing pulse train, and means for integrating said output pulses of said fifth circuit means and recording the integrated pulses.

5. The apparatus of claim 4 wherein said fifth circuit means comprises sixth circuit means connected to said second means and to said pulse generating means for producing an output pulse in a first output circuit thereof upon concomitant reception of pulses in said second coded pulse train and said second timing pulse train, and for producing a pulse in a second output circuit thereof upon concomitant reception of a pulse in said second timing pulse train and a pulse from said second circuit means, and first and second bistable multivibrator means, each electrically connected to said pulse generating means and to said sixth circuit means, said first bistable multivibrator means being operative to produce an output pulse responsive to pulses in said sixth circuit means output circuit, said second bistable multivibrator means being operative to produce a pulse upon production of a pulse in said sixth circuit means second output circuit, the output pulses produced by said first and second bistable multivibrator means being of mutually opposite polarity, said first and second bistable multivibrator means being reset to initial operating conditions thereof by the pulse in said second timing pulse train next following the production of an output pulse thereby.

6. Apparatus for measuring the travel time of seismic waves between the earth's surface and a geophone spaced therefrom, comprising:

a support member;

a disc containing a plurality of radial timing slots uniformly spaced apart, a plurality of first code holes, and a plurality of second code holes, said first and second code holes being positioned on circular paths of first and second radii, respectively, radially in line with said timing slots, the distribution of said code holes being according to a binary code of maximal length;

a shaft for connection to a motor, axially connected to said disc and journalled in said support member for rotating said disc;

a scanning arm rotatively supported on said shaft for rotation thereon independent of the rotation of said disc and shaft;

first light source means and first and second light detecting means positioned on opposite sides of said disc such that said first light detecting means detects light passing through said timing slots to produce first electrical output pulses, and second light detecting means detects light passing through said first code holes to produce second electrical output pulses;

second light source means and third and fourth light detecting means positioned on said scanning arm on opposite sides of said disc so that said third light detecting means detects light passing through said timing slots to produce third electrical output pulses and said fourth light detecting means detects light passing through said second code holes to produce fourth electrical output pulses;

first circuit means connected to said first and second light detecting means for producing a sinusoidal output signal having one phase responsive to concomitant pulses from said first and second light detecting means, and having the opposite phase responsive to a pulse only from said second light detecting means;

electrical terminal means for connection to said geophone;

second circuit means connected to said terminal means for producing pulses responsive to a predetermined signal condition of the electrical signals applied to said terminal means;

third circuit means connected to said second circuit means and said third and fourth light detecting means for producing an output pulse of one polarity in an output circuit thereof upon concomitant reception thereby of pulses from said third and fourth light detecting means, and an output pulse of the other polarity upon concomitant reception thereby of pulses from said second circuit means and said third light detecting means; and means for integrating said output pulses of said third circuit means and recording the integrated pulses.

7. The apparatus of claim 6 wherein said first circuit means comprises fourth circuit means responsive to concomitant pulses from said first and second light detecting means to produce a single-cycle rectangular wave signal having the opposite phase upon reception thereby of pulses from said first light detecting means unaccompanied by pulses from said second light detecting means, each single-cycle rectangular wave signal produced by said fourth circuit means having a period equal to the period between pulses produced by said first light detecting means, and low pass filter means for shaping said rectangular wave to substantially sinusoidal waveform.

8. The apparatus of claim 6 wherein said third circuit means comprises fifth circuit means connected to said second circuit means, said fourth light detecting means, and said third light detecting means for producing an output pulse in a first output circuit thereof upon concomitant reception thereby of pulses from said third light detecting means and said fourth light detecting means, and for producing a pulse in a second output circuit thereof upon concomitant reception thereby of pulses from said third light detecting means and said first circuit means, and means including first and second bistable multivibrator means having a common output circuit, each electrically connected to said third light detecting means to be set in a first stable state responsive to an output pulse from said third light detecting means, and respectively connected to said first and second output circuits of said fifth circuit means, each operative to be triggered to a second stable state thereof and to produce an output pulse upon reception of a pulse from said fifth circuit means output circuit connected thereto, the pulses produced by said first and second bistable multivibrator means being of mutually opposite polarity and being produced in a common output circuit.

9. The apparatus of claim 8 wherein said third circuit means further includes means for combining the output signals of said first and second multivibrator means comprising full-wave rectifier means having a pair of input terminals connected to the output circuit of said first and second multivibrator means, and a pair of output terminals.

No references cited.

BENJAMIN A. BORCHELT, *Primary Examiner.*

M. F. HUBLER, *Assistant Examiner.*